United States Patent [19]
Eastham

[11] 3,866,703
[45] Feb. 18, 1975

[54] ELECTRIC DRIVE TRANSMISSION SYSTEMS
[75] Inventor: John Frederick Eastham, Long Ditton, England
[73] Assignee: K. G. Engineering Laboratories Limited, Birmingham, Warwickshire, England
[22] Filed: July 2, 1973
[21] Appl. No.: 375,644

[30] Foreign Application Priority Data
July 26, 1972 Great Britain.................... 35008/72

[52] U.S. Cl............................................. 180/65 R
[51] Int. Cl............................................. B60k 1/00
[58] Field of Search.................... 180/65 R; 318/139

[56] References Cited
UNITED STATES PATENTS
1,423,090  7/1922  Delano............................ 180/65 R
3,179,199  4/1965  Moran............................. 180/65 R FOREIGN PATENTS OR APPLICATIONS
1,104,354  2/1968  Great Britain.................... 180/65 R Primary Examiner—Richard A. Schacher
Assistant Examiner—James M. Slattery
Attorney, Agent, or Firm—Parmelee, Miller, Welsh & Kratz

[57] ABSTRACT
A battery driven car is provided with a transmission system which includes an induction motor fed by way of an inverter from the battery and which drives the wheels through a gear box and a clutch. The gear box enables the induction motor to maintain a sufficient speed to cool itself even when the car is driving at slow speed up a steep hill. The gear box and clutch may be conventional manually operated mechanisms and there is provision for the inverter to be used to charge the battery.

3 Claims, 11 Drawing Figures

ELECTRIC DRIVE TRANSMISSION SYSTEMS

INTRODUCTION

This invention relates to a drive system utilising a rechargeable battery as its source of power.

BACKGROUND TO THE INVENTION

Although many forms of power source for an electric car have been suggested, the conventional lead/acid battery developed over many years has proved itself to have the ruggedness and reliability necessary for a car drive system and is also capable of being recharged and of being relatively cheaply produced despite its high level of sophistication. It is therefore a preferred choice as a source of electrical power, at least at the present time, despite its weight and size.

Most battery car drive systems use direct current (d.c.) series motors. These machines are, of course, commutator motors and hence require regular brush maintenance. In addition, the rotor carries an insulated coil winding in its slots which limits the peripheral speed. This in turn restricts the output from a particular frame size. The machine also produces a system disadvantage in that regeneration, from an overhauling load, is difficult to arrange in that it requires a change in circuit configuration.

The use of a squirrel cage induction motor as a drive means is capable of avoiding the above-mentioned disadvantages as the squirrel cage rotor can have a robust winding consisting of a set of cast aluminium bars with integral end-rings. Such rotors can spin at high speed without damage and do not require a commutator or brush gear. The induction motor can, in addition, provide a system advantage in that regeneration is possible without a change in the main power connections. However, an induction motor inherently requires a polyphase alternating current (a.c.) supply and this means that an inverter is necessary in order to provide an alternating current supply from a d.c. source such as a battery.

When energised, the stator coils of a polyphase induction motor produce a rotating field pattern. The rotational speed ($\omega s$) depends on the number of pole pairs ($2p$) produced by the winding and the frequency ($f$) of the current supplied. The speed of an induction motor is relatively close to the synchronous speed which is expressed by the equation $\omega s = 60 f/p$ r.p.m.

The output torque against rotor speed characteristic of a typical induction motor is shown in the accompanying FIG. 3A from which it will be noticed that the torque is positive when the rotor speed is below the synchronous speed and negative for all speeds above. In the positive torque, power is supplied to the mechanical output of the motor from the electrical input. In the negative torque region, power is taken from the mechanical system and absorbed electrically so as to give rise to regenerative braking. The ability of an induction motor to brake regeneratively is important in a battery-driven car because a limiting factor on the car range is the battery charge which can be conserved to some extent by making use of regenerative braking to return some of the power to the battery. This enables the car range to be increased without requiring a heavier, large and more costly battery.

Unfortunately, it is difficult to arrange an induction motor to have its maximum torque at standstill without impairing its high speed running efficiency.

Also, when an induction motor is providing positive torque, its efficiency is given by $\omega r/\omega s$ where $\omega r$ is the rotor speed. In other words, for efficient use of an induction motor the rotor speed must be close to the synchronous speed. Although by varying the synchronous speed one could maintain a relatively high efficiency of operation of the induction motor one is still left with the problem that its torque output when controlled this way is approximately constant with speed whereas the torque requirements of a car vary with the terrain and the desired acceleration.

An object of this invention is the provision of a relatively rugged and simple electric drive system particularly suitable, although not exclusively, for a car.

THE INVENTION

An electric battery driven vehicle has, in accordance with the broadest aspect of the invention, its drive wheels connected through a gear box and a clutch to a rotor of an induction motor which is supplied with alternating current at a variable controlled frequency by an inverter arranged to draw d.c. power from the battery. Preferably the battery is rechargeable through the inverter by energy extracted from the motor such as when braked regeneratively to decelerate the vehicle. Suitably in accordance with a narrower aspect of the invention, a battery drive system for a vehicle has an induction motor arranged to drive the wheels through a gear box and clutch and to be supplied with an alternating current at variable frequency from a solid state inverter having its output frequency controlled by a bias signal obtained in part from the slip speed required to produce the desired output torque of the induction motor and in part from the speed of the motor, the inverter output frequency being so controlled that the motor delivers a called-for torque at a relatively high efficiency.

Slip speed is defined as the difference in speed between the field and the rotor. By relatively high efficiency is meant an efficiency which in all but the lowest speed ranges corresponding to a car speed of less than 2-3 mph does not fall beneath 80% or thereabouts.

ADVANTAGES OF THE INVENTION AND PREFERRED FEATURES

The advantage of such a drive system is that it utilises well-tried components and overcomes the previously mentioned disadvantages inherent in conventional drive systems. It also enables the induction motor to operate indefinitely in conditions when there is a high torque demand at a low speed such as when the vehicle is climbing a steep hill. A normal d.c. motor or an induction motor without a gear box would rapidly burn out under such conditions unless provided with a separate cooling fan and, additionally, the slip of the induction motor under such conditions would be so large that the efficiency would be very poor. By using the gear box the induction motor speed can be maintained at a value at which it can maintain itself cool. Preferably, the inverter is controlled by an analogue electrical bias signal and the part of such signal which is obtained from the drive speed of the vehicle is conveniently produced by a tachogenerator driven by the induction motor.

The called-for torque may be positive or negative depending on whether the vehicle is to be accelerated or decelerated. The gear box enables the torque output of the induction motor to be controlled to give acceptable accelerating and hill-climbing characteristics and the frequency control ensures that at all speeds a relatively high efficiency is obtained together with a satisfactory high torque.

The invention will now be described in more detail, by way of examples, with reference to the accompanying drawings, in which:

IN THE DRAWINGS

DESCRIPTION OF PREFERRED EMBODIMENT

Figure 1:
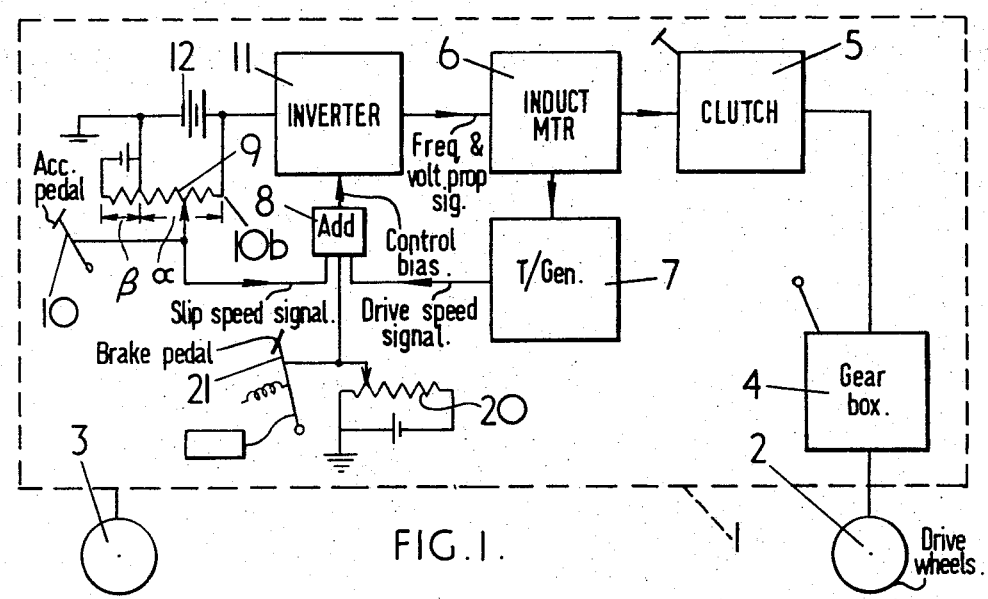
FIG. 1 is a diagrammatic circuit lay-out of a car.

Referring to FIG. 1, a car denoted by the broken outline 1 is provided with road wheels 2, 3 of which the former are driven by way of a gear box 4 which receives drive by way of a pedal operated clutch 5 from an induction motor 6. A tachogenerator 7 is connected to the induction motor shaft and provides an analogue voltage, proportional to the motor speed, to an adder 8 which receives a second analogue voltage from a slider of a potentiometer 9 whose position is controlled by an accelerator pedal 10. The two analogue signals are aggregated in the adder 8 to provide a control bias which is applied to a solid state inverter 11 to control the frequency of its electrical output which is fed to the induction motor 6. The inverter receives power from a battery of lead/acid cells 12 shown diagrammatically and across which the potentiometer 9 is partially connected. The negative terminal of the battery 12 is connected to the chassis of the car.

Figure 2:
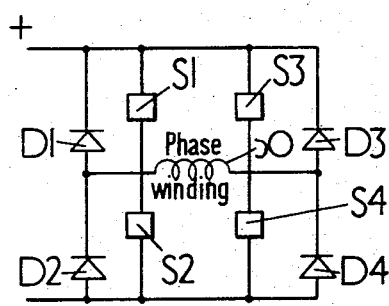
FIG. 2 shows an inverter circuit as used in FIG. 1.

The inverter which is shown in more detail in FIG. 2, could take any one of a number of forms. Its most essential requirement is that it must be capable of allowing power flow in either direction. This means that feed-back rectifiers must be included across each of a number of switching elements which may comprise either thyristors or transistors. FIG. 2 shows one phase of a two-phase inverter and it will be understood that the second phase is the same as the first but switching signals to the switches S1 to S4 of the second phase are so controlled that the output voltage it produces is in quadrature with that of the phase shown in FIG. 2. The inverter operates by means of pulse-width control in order to vary the voltage output and to achieve this the switches S1 and S2 are opened and closed in turn at the basic required output frequency, whilst the switches S3 and S4 are opened and closed alternately at a higher frequency of, say, eight times the basic frequency. In this way a control of the mark-to-space ratio of the switches S1 and S4 modulates and therefore controls the level of the output voltage.

Figure 3A:
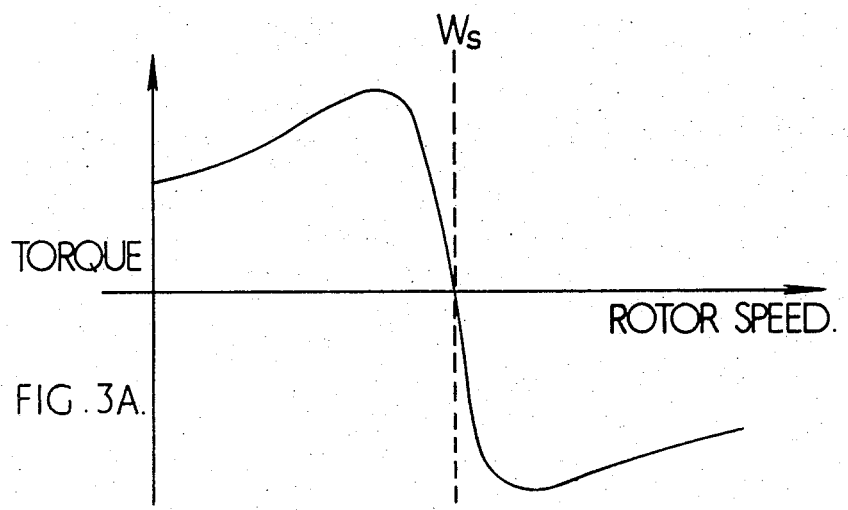
FIGS. 3A, 3B and 3C are plots of torque against speed to explain operation of the system.
Figure 3B:
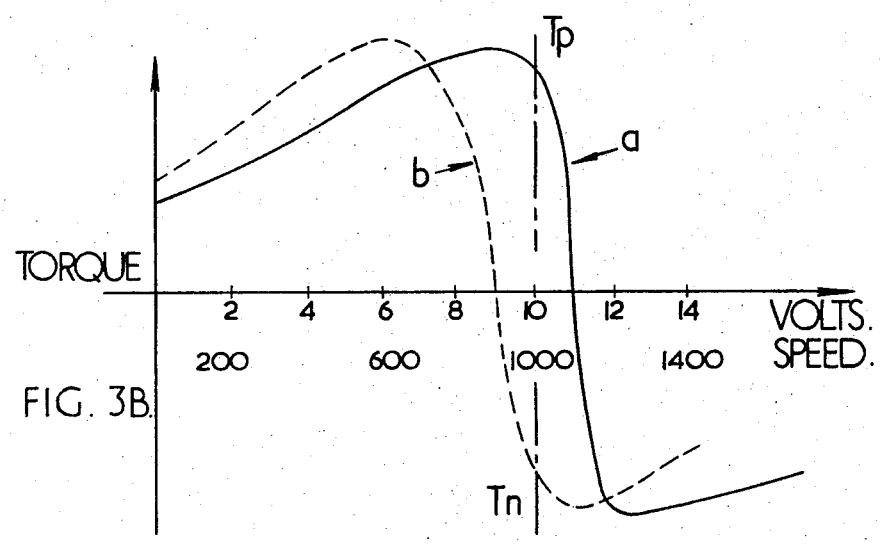

The part of the analogue voltage obtained from the potentiometer 9 to produce the desired output torque is a signal proportional to the slip speed of the induction motor and is signified by the position of the accelerator pedal 10. FIG. 3B illustrates the intended action by means of an example. The chain line in FIG. 3B represents the rotor speed at 1,000 r.p.m. which produces a tachovoltage of 10 volts in the example under consideration. If a positive torque level corresponding to 100 r.p.m. of slip is required, then 1 volt is added to the tachovoltage and this is applied by way of the adder 8 to the inverter frequency control input. It is arranged that the field speed produced by the inverter supply bears exactly the same relationship to the analogue signals as the tachogenerator voltage output bears to the rotor speed. Therefore, the field speed provided by the inverter for a control voltage of 11 volts is 1,100 r.p.m. This results in the torque characteristic $b$ shown in full outline and therefore a positive torque Tp is produced. Conversely, if a negative torque corresponding to regenerative braking is required from the induction motor when the rotor speed is 1,000 r.p.m., then a 1 volt signal is subtracted from the tachovoltage in the adder 8. The control voltage fed to the inverter 11 then corresponds to a motor speed of 900 r.p.m. and the torque curve shown in broken outline is produced which, at the speed under consideration of the vehicle, produces a negative torque and consequently regenerative braking.

Figure 3C:
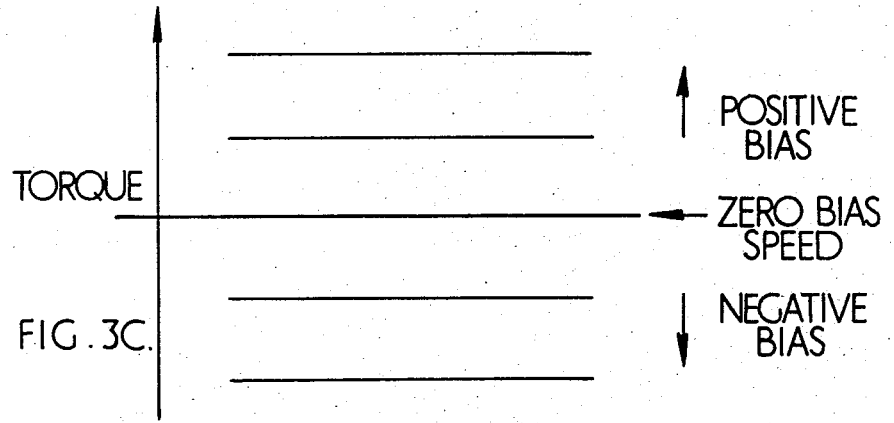

From the example given above it will be apparent that full torque control up to the peak available from the motor can be obtained simply by varying the bias voltage between positive and negative limits and that this control can be exercised at any speed. FIG. 3 C shows the torque output which can be expected at different fixed bias voltage settings.

In practice, the motor voltage requirements will depend on its design but in general the voltage applied should be approximately proportional to the frequency and this is a feature inherent in the inverter design.

Figure 4:
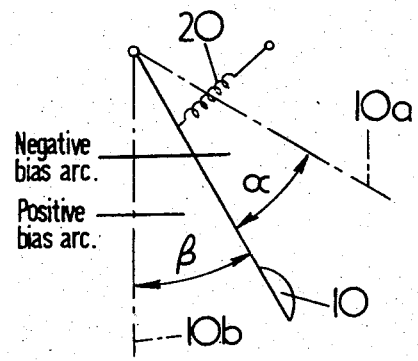
FIG. 4 shows movement of an accelerator pedal.
Figure 5:
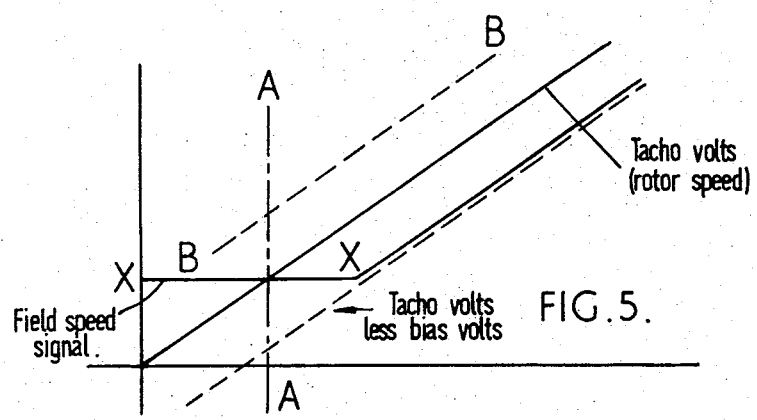
FIG. 5 shows the effect of portions of such movement on the car's performance.

FIG. 4 shows the accelerator pedal 10 in an intermediate position, its two extreme positions being referenced 10a and 10b. The pedal 10 is depressed against the bias of a spring 20 and it travels through a negative bias arc $\alpha$ before reaching the positive bias arc $\beta$. These two bias arcs $\alpha$ and $\beta$ are shown in FIG. 1 and the way in which the torque level applied to the vehicle is varied will be understood with reference to FIG. 5.

OPERATION

The operational sequence on starting the car is as follows. The power is first switched on to the inverter with the gear box in neutral and the accelerated pedal at its position 10a. The speed signal from the tachogenerator 7 is then zero and the inverter bias signal is obtained wholly from the negative portion of the potentiometer 9 and is therefore negative. It is arranged that all control bias signals under a predetermined level indicated by the horizontal line X—X in FIG. 5, produce a minimum inverter frequency. This may be obtained by using a suitable "catching" circuit. For rotor speeds below the line A—A the field speed, held at its minimum value by the catching circuit, is arranged to be greater than the motor speed and a positive torque is produced. The motor would therefore run up to the line A—A which corresponds to the motor idling speed.

The car can now be put in gear with the clutch 5 depressed. The effect of engaging the clutch with the accelerator pedal 10 at its upper limiting position 10a is to place a load on the induction motor 6 causing the tachogenerator output speed signal to fall slightly and the car would run at a speed below A—A in FIG. 5. If the pedal is now depressed to give a positive bias signal corresponding to the broken line B—B then the car would accelerate at the corresponding torque level. The operations have been described separately, however, in practice of course the clutch would be engaged and the accelerator pressed simultaneously as in normal driving technique.

The gear changing to the next ratio is accomplished by first de-clutching and releasing the accelerator. The motor then quickly slows down as a result of the pedal 10 being released into its negative bias arc $\alpha$ and the motor would brake regeneratively to return energy through the inverter to the battery 12. The next gear can then be engaged and the sequence of acceleration continued.

It will therefore be apparent that when the accelerator pedal 10 is released one gets dynamic breaking through the transmission as long as the clutch is engaged as in a conventional motor-driven car utilising engine braking. However, the energy released during this braking is returned to supplement the charge on the battery instead of being dissipated as heat.

In practice, the full measure of regenerative braking would not be built into the accelerator pedal 10 since in any case a mechanically operated brake is provided. The amount of negative bias voltage available from the accelerator pedal should however be sufficient to run the motor down quickly during upward gear changing. This is obtained by controlling the minimum frequency level corresponding to the output of the "catching" circuit.

To provide regeneration during normal braking occurring when a brake pedal 21 is depressed (see FIG. 1) a third input is provided to the adder 8 from a second potentiometer 20. This is connected across a battery providing negative bias which increases when the slider of the potentiometer is moved by the brake pedal 21 which also controls a master braking cylinder of an hydraulic braking system in conventional manner. During braking of the car by means of the brake pedal 21, the first part of the travel of the brake pedal provides only a supplementary negative bias signal to the adder 8 to reduce the inverter output frequency so that the induction motor 6 is braked regeneratively to a greater extent than is possible with the accelerator pedal 10. The hydraulic braking system is not at this time effective. After the first part of the travel of the mechanical brake is completed, the full mechanical braking system takes over to bring the car to a standstill by conventional friction braking and throughout this braking the maximum negative bias signal is applied to the adder 8. A lost-motion linkage (not shown) allows the potentiometer 20 to remain in its maximum negative bias position throughout mechanical braking and irrespective of the position of the brake pedal 21.

FIRST MODIFICATION OF EMBODIMENT

Figure 6A:
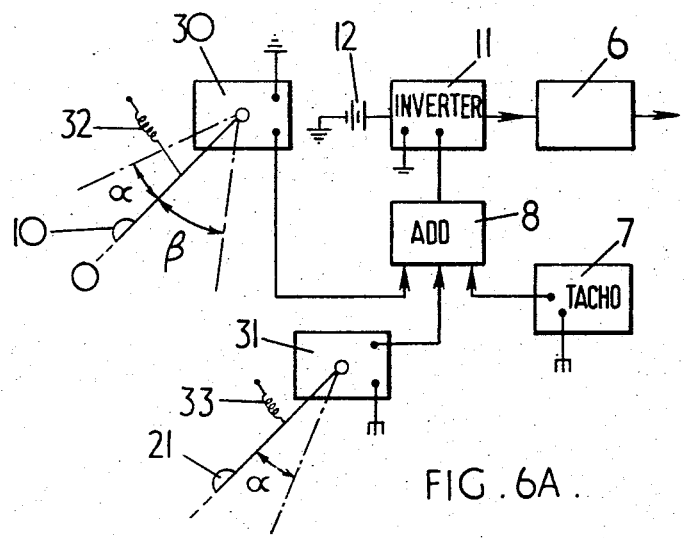
FIG. 6 shows in diagram A a first modification of the circuit of FIG. 1 where potentiometric transducers are replaced by electromagnetic transducers, diagrams B and C showing graphically operating characteristics obtained by these transducers respectively.

In the first modification shown in FIG. 6A the parts identical to those shown in FIG. 1 are correspondingly referenced. However in place of the potentiometer devices 9 and 20, electromagnetically operated transducers 30 and 31 are provided. Each of the transducers 30, 31 provides a direct current output giving the slip speed signal and regenerative braking signal, respectively, to the adder 8 which provides the control bias to the inverter 11 as formerly. The direct current output in each case varies linearly with the displacements of the respective associated pedals 10 and 21. The advantage of using electromagnetic transducers is that they can be more sturdily constructed than resistive potentiometer devices. Each may incorporate its own conversion circuits for changing alternating current to direct current and vice-versa. Movement of the pedals 10, 21 from their respective rest positions is resisted by respective springs 32, 33.

Figure 6B:
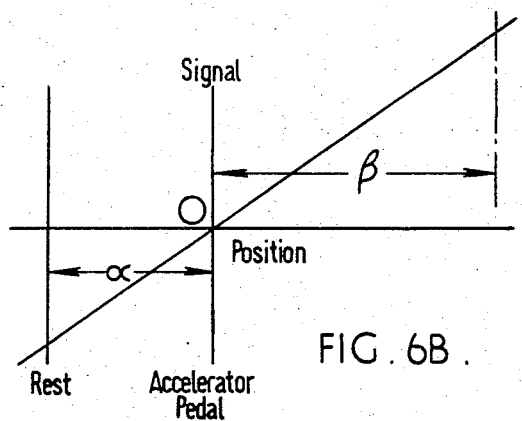

FIG. 6B shows the variation in electrical output signal with different positions of the acceleration pedal 10 and the linear change together with the two pedal movement ranges $\alpha$ and $\beta$ during which regenerative braking and acceleration of the induction motor take place, as formerly, are clearly illustrated.

Figure 6C:
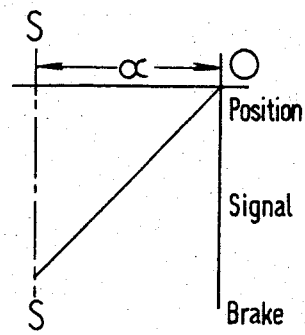

Likewise FIG. 6C shows how with gradual depression of the brake pedal 21 through the range $\alpha$, there is a gradual increase in the regnerative braking signal fed to the induction motor inverter. At the end of the range, denoted by the broken line S—S, mechanical braking commences to supplement the regenerative braking.

Electromagnetic transducer connections suitable for use in such a system are described in "Handbook of transducers for electronic measuring systems" by H. N. Norton (Published by Prentice Hall) between pages 182 and 186.

A further form of transducer which may be used is an electro-optical one. This is provided by a closed chamber containing a light source and a photo-sensitive device such as a photo-electric cell. The quantity of light falling on the photo-sensitive device is controlled by an attenuator which is movable between the two and is positionally controlled by the accelerator pedal position. Such an arrangement has the advantage that no alternating current source such as is necessary with an electromagnetic transducer, is required.

SECOND MODIFICATION OF EMBODIMENT

Figure 7:
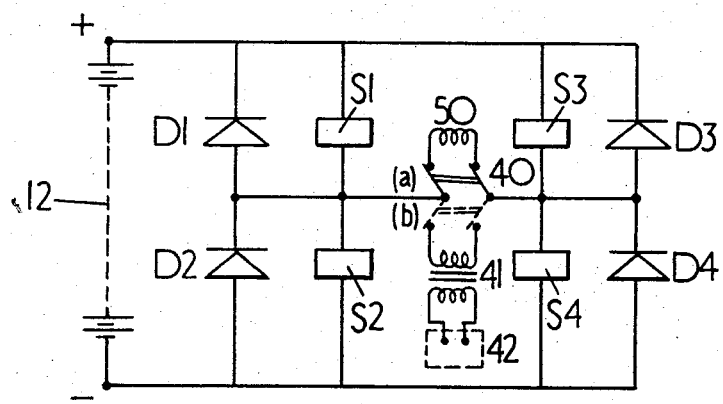
FIG. 7 shows a second modification in which a charging facility for the battery is provided by way of the inverter.

In the second modification shown in FIG. 7 and which concerns the inverter, the parts which are identical to those shown in FIG. 2 are correspondingly referenced. The alternating output terminals of the inverter which in FIG. 2 are connected directly to the induction motor winding are, in FIG. 7, taken instead to a double-pole double-throw switch 40 whose two positions (a), (b), are shown respectively in continuous and broken outline. In the former position the inverter is connected to the motor winding 50 for normal running of the car. The switch is moved to the second position when the charging of the battery is necessary. In this case the inverter a.c. terminals are connected to the secondary side of a voltage dropping device provided by a transformer 41 whose primary side is connected to socket contacts 42 provided on the car. The socket contacts can have plugged into them a charging lead (not shown) from an a.c. domestic supply. The diodes $D_1 - D_4$ rectify this supply and feed it through the battery so that a separate battery charger is unnecessary.

Although in the above described embodiments the application of the invention is to a car having a manual gear box and pedal-operated clutch, it is to be understood that the invention is equally usable with an automatic gear change mechanism. In this case deceleration of the motor during periods when it is declutched to enable a lower gear ratio to be selected, may be effected by injecting a suitable component in the inverter bias signal to regeneratively brake the motor.

I claim:

1. A car having a battery, a solid state inverter connected to receive direct current from said battery, an induction motor supplied with alternating current from the inverter, drive wheels, a drive transmission connecting the induction motor to the drive wheels, a gear box and clutch connected in said drive transmission, a speed control pedal, a brake pedal, bias means controlling the operating frequency of said inverter so that the motor slip speed is that required to produce a desired motor output torque, first signal generating means controlled by said motor and providing said bias means with a first signal significant of the actual speed of the motor, and second signal generating means controlled by said speed control pedal and producing a first range of second signals with slight depression of the speed control pedal and a second range of second signals with further depression of the speed control pedal said second signal generating means providing said second signals to the bias means; said bias means so controlling said inverter output frequency and the gears being so chosen that the motor delivers the called-for torque at high efficiency without overheating and the influence of said first range of second signals on the bias means is to so vary the inverter output that the motor is regeneratively braked by feeding power back through the inverter to the battery while the influence of said second range of second signals on the bias means is to vary the inverter output to accelerate the motor to an increased torque delivery dependent on the pedal position.

2. A car as claimed in claim 1, in which said brake controls a third signal generating providing a third signal to said bias means to regeneratively brake said motor by way of the inverter and the battery, said third signal generator being alone effective during slight braking but a mechanical braking system also controlled by the brake pedal becoming effective to brake the car harder if the brake pedal is depressed more than slightly.

3. A car as claimed in claim 1, in which said bias means comprises an adder and said signals fed to said bias means comprise analogue signals which are added in the adder to provide the bias signal to the inverter.

* * * * *